United States Patent [19]
Steffen

[11] 4,068,223
[45] Jan. 10, 1978

[54] MONITOR SYSTEM FOR AGRICULTURAL HARVESTING APPARATUS

[75] Inventor: Ronald W. Steffen, Chatham, Ill.

[73] Assignee: Dickey-john Corporation, Auburn, Ill.

[21] Appl. No.: 594,757

[22] Filed: July 10, 1975

[51] Int. Cl.² .................. G08B 21/00; A01D 45/18
[52] U.S. Cl. ........................... 340/267 R; 56/10.2; 73/198
[58] Field of Search .............. 73/198, 204, 194 R, 73/194 E; 340/239 R, 243, 228 R, 228 S, 267; 56/10.2

[56] References Cited

U.S. PATENT DOCUMENTS

| | | | |
|---|---|---|---|
| 2,745,283 | 5/1956 | Hastings | 73/204 |
| 3,199,348 | 8/1965 | Salera | 73/204 |
| 3,312,966 | 4/1967 | Schaller | 73/204 |
| 3,335,606 | 8/1967 | Scarpa | 73/204 |
| 3,336,804 | 8/1967 | Poppendick | 73/204 |
| 3,366,942 | 1/1968 | Deane | 73/204 |
| 3,403,555 | 10/1968 | Versaci et al. | 73/194 E |
| 3,592,058 | 7/1971 | Benson | 73/204 |
| 3,762,221 | 10/1973 | Coulthard | 73/194 E |
| 3,863,428 | 2/1975 | Baxter | 56/10.2 |

Primary Examiner—Richard C. Queisser
Assistant Examiner—Stephen A. Kreitman
Attorney, Agent, or Firm—Olson, Trexler, Wolters, Bushnell & Fosse

[57] ABSTRACT

The embodiment of the invention disclosed herein is directed to a monitoring system for detecting variations in the flow of a fluid through a passage such as an air duct associated with a cotton picker or other harvesting machine. Air flow sensing means is provided for mounting in the air duct to provide a first signal condition in response to the flow of air above a predetermined minimum level and a second signal condition in response to the flow of air below the predetermined minimum level. The air flow sensing means is coupled to an indicator means which attracts the attention of the harvesting machine operator and indicates which one, of a plurality of air ducts, is malfunctioning.

19 Claims, 14 Drawing Figures

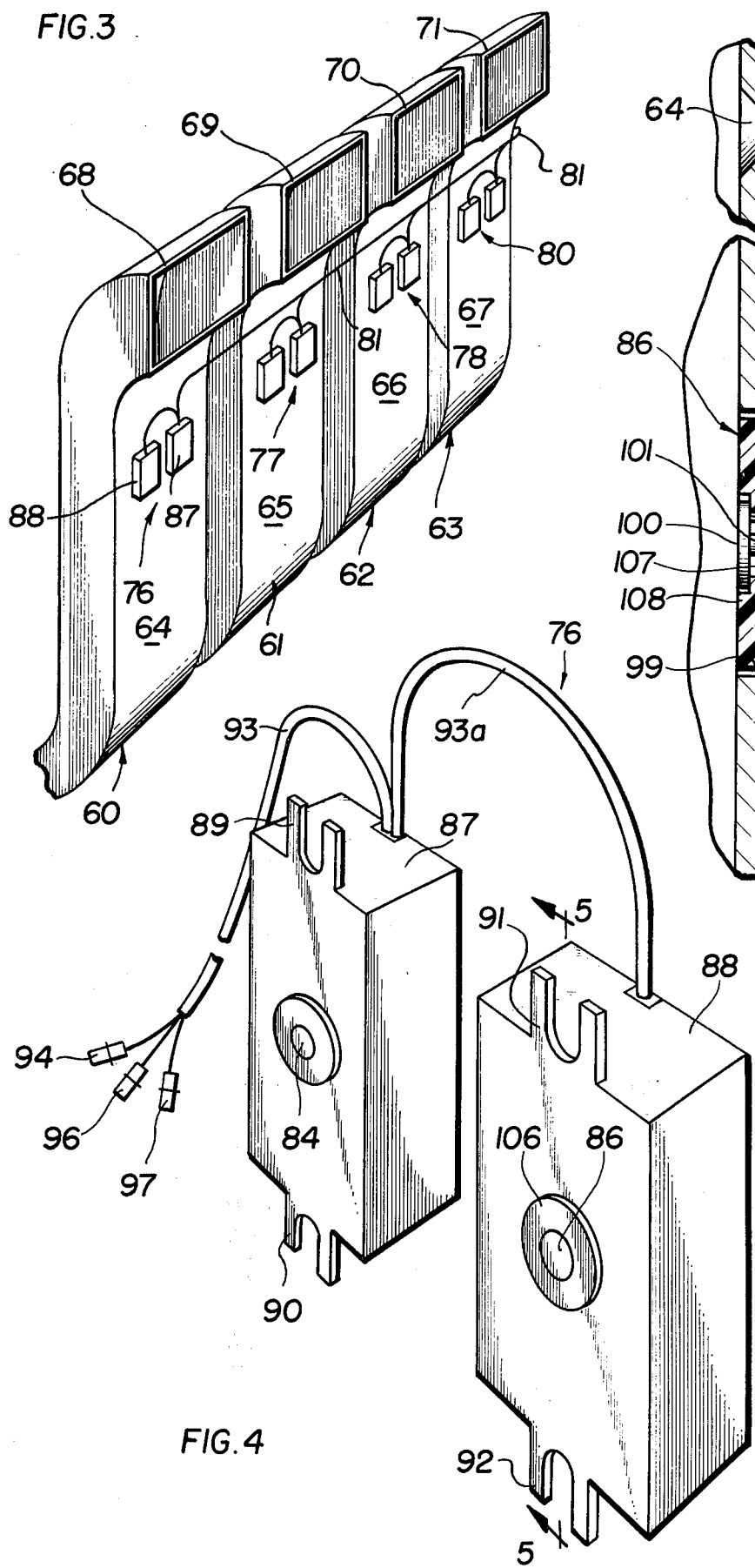
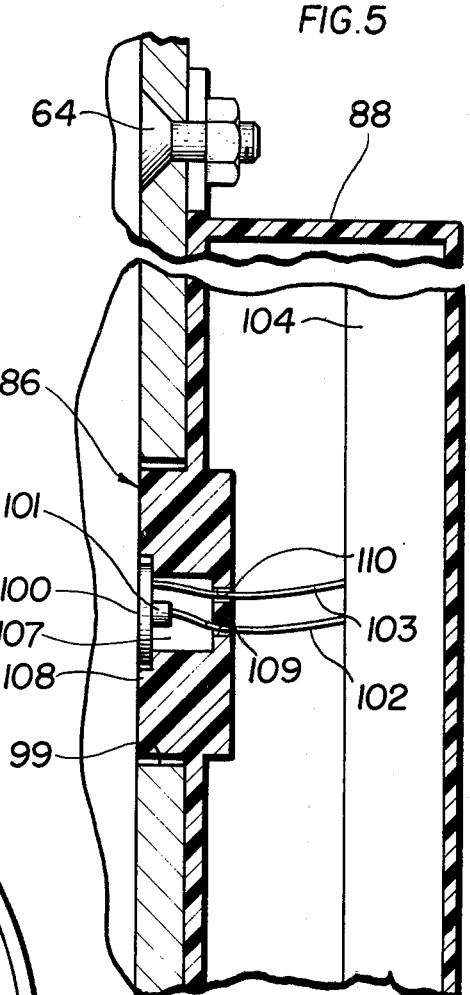

AIR FLOW (ft./min.)

MONITOR SYSTEM FOR AGRICULTURAL HARVESTING APPARATUS

BACKGROUND OF THE INVENTION

This invention relates to a monitor system for detecting variations in the flow of a fluid, and more particularly, to a monitoring system for detecting the stoppage of air flow through duct means. The invention has substantial utility when used in conjunction with agricultural harvesting apparatus such as a cotton picker, or the like, and is herein illustrated in conjunction with such harvesting apparatus. However, it will be understood that the monitoring system of this invention has novel concepts which can be utilized in detecting variations in the flow of liquids as well as gases.

It is well known that automatic harvesting equipment greatly improves the efficiency and productivity of producing agricultural products. For example, in the harvesting of cotton, large automatic cotton pickers are utilized to harvest large crop-fields in a single day. These cotton pickers are engine-driven machines which are transported over the ground and have picking apparatus positioned in the front of the machine to remove cotton balls from the cotton plants. The cotton balls are then transported through suitable duct means within the machine and deposited within a receptacle resembling a large wire cage located at the top or rear of the machine. To assist in picking the cotton, the cotton picking mechanism may be made wet by spraying water thereon so that the cotton is more easily removed from the plant. This enables a larger quantity of cotton to be picked from the plants and thereby increases the efficiency of the cotton harvesting equipment.

For one reason or another, the cotton may clog the duct through which it travels en route to the receptacle and stop the flow of cotton from the cotton plants to the receptacle. Should this happen, the operator would not know of the blockage until he observes that no cotton is passing through the outlet of the duct. This may be difficult to detect as many large automatic cotton pickers are provided with several ducts through which the cotton flows en route to the receptacle. Therefore, should one of the ducts become clogged, it may be hard to detect since cotton is still coming out of the other ducts. Also, the water tank utilized for wetting the picking spindles will run dry several times during the picking operation. This requires the operator to stop the picker and refill the water tank to maintain the picking spindles clean and to insure proper picking action.

SUMMARY OF THE INVENTION

Accordingly, it is an object of this invention to provide a novel monitoring system for monitoring the passage of cotton through duct means associated with a cotton picker.

Still another object of this invention is to provide a monitor system for monitoring the flow of articles through a duct-type air flow conveying apparatus.

Still another object of this invention is to provide a novel monitoring system for detecting variations in the flow of a fluid passing through a passage such as duct means or the like.

One feature of this invention is the utilization of a heated element to be positioned in contact with the flow of air, or other fluid, passing through duct means so that the heated element is cooled. At one temperature, the heated element provides a first signal condition and at another temperature, the heated element provides a second signal condition.

Briefly, the monitor system of this invention is designed to detect a minimum air flow through a duct system which has particular utility when used in conjunction with agricultural apparatus such as a cotton picker or the like. For example, the air flow through the ducts of a conventional cotton picker may have a velocity in the order of about 4000 to 6000 feet per minute, depending on the particular model of the cotton picker-harvester utilized. A cotton picker may have two or more air ducts for every row of cotton being picked. Therefore, a two-row cotton picking machine would have four ducts extending therethrough to a wire basket-type receptacle at the rear of the machine. A cotton picking machine may, on the other hand, have only one air duct for each row of cotton being picked. In either case, the air ducts are required to be maintained clog-free so that the cotton picking machine can be transported continuously over the ground at a constant speed for picking cotton, thereby increasing efficiency and reducing the cost for such harvesting operations.

When the cotton gets clogged in the air ducts passing through the machine, for one reason or another, or when the fan of the blower fails to operate properly, air velocity through the ducts decreases substantially. This decrease in air velocity is sensed by the monitor system of this invention to actuate an alarm to warn the operator that a malfunction has occurred.

In one embodiment of this invention, the air velocity sensing device incorporates a heated element, such as a thermistor, which is in direct contact with the air flow passing through the ducts of the cotton picking machine. As the air flows across the heated element, it is cooled to a predetermined temperature and, therefore, provides a first output signal indicating that the air flow is above a predetermined minimum value as desired. When the air flow through the ducts decreases, the temperature of the heated element will increase to produce a second signal condition to actuate the alarm and indicate that a decrease in air flow has occurred.

Most advantageously, an ambient temperature-sensing thermistor is also utilized in conjunction with the heated thermistor and cooperates therewith so that the air flow sensing device can operate over a wide range of ambient temperatures.

In another embodiment of this invention, the air flow is sensed by a photocell and a light source positioned on opposite walls of the air ducts. It will be understood that photo transistors and other similar detectors can be used. The photocell receives light from the light source and produces output signals caused by particles of cotton passing through the duct along with the air flow. Should the duct become clogged, the cotton no longer flows so that pulses or signals caused by the passing cotton are eliminated or changed to produce an output signal for indicating that the cotton flow has failed for one reason or another, such as a clogged or partially blocked condition in the duct, or failure of the picker. It will be noted that any suitable photo responsive means may be used such as a photo transistor or other similar detector.

Still another embodiment of this invention incorporates the use of a pair of thermocouples in a special arrangement. The thermocouples are formed of two brass disks with a nickel finish. A thermocouple junction of constantan and copper wires is formed on each of the disks. One of the disks is heated by a resistor while the other disk senses ambient temperature. The heated thermocouple produces an output signal in accordance with the heat transfer characteristic of the thermocouple to the air flow sensed in the air flow duct. The unheated thermocouple is responsive to the ambient temperature in the air flow in the duct. The two signals from the heated and unheated thermocouples are compared to produce a corresponding signal responsive to air flow.

A novel circuit arrangement is used for sensing the output of the thermocouple arrangement. Here a square wave oscillator is utilized to switch between sensing the voltage across the thermocouples and the voltage across a reference source. The thermocouple and reference source alternately applied to an amplifier in accordance with each half cycle of operation of output from the oscillator. This signal is then amplified and delivered to a second amplifier which produces a square wave output signal having a peak to peak value corresponding to the difference between the reference signal and the signal from the thermocouples.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 3 is a diagrammatic perspective view illustrating a plurality of ducts through which cotton is transported and which ducts incorporate air flow sensing devices constructed in accordance with the principles of this invention;

FIG. 4 is an enlarged perspective view of one air flow sensing device constructued in accordance with the principles of this invention;

FIG. 5 is a sectional view taken along line 5—5 of FIG. 4 illustrating the basic construction of one form of temperature-sensing device utilized in accordance with this invention;

DETAILED DESCRIPTION OF THE ILLUSTRATED EMBODIMENTS

Figure 1:
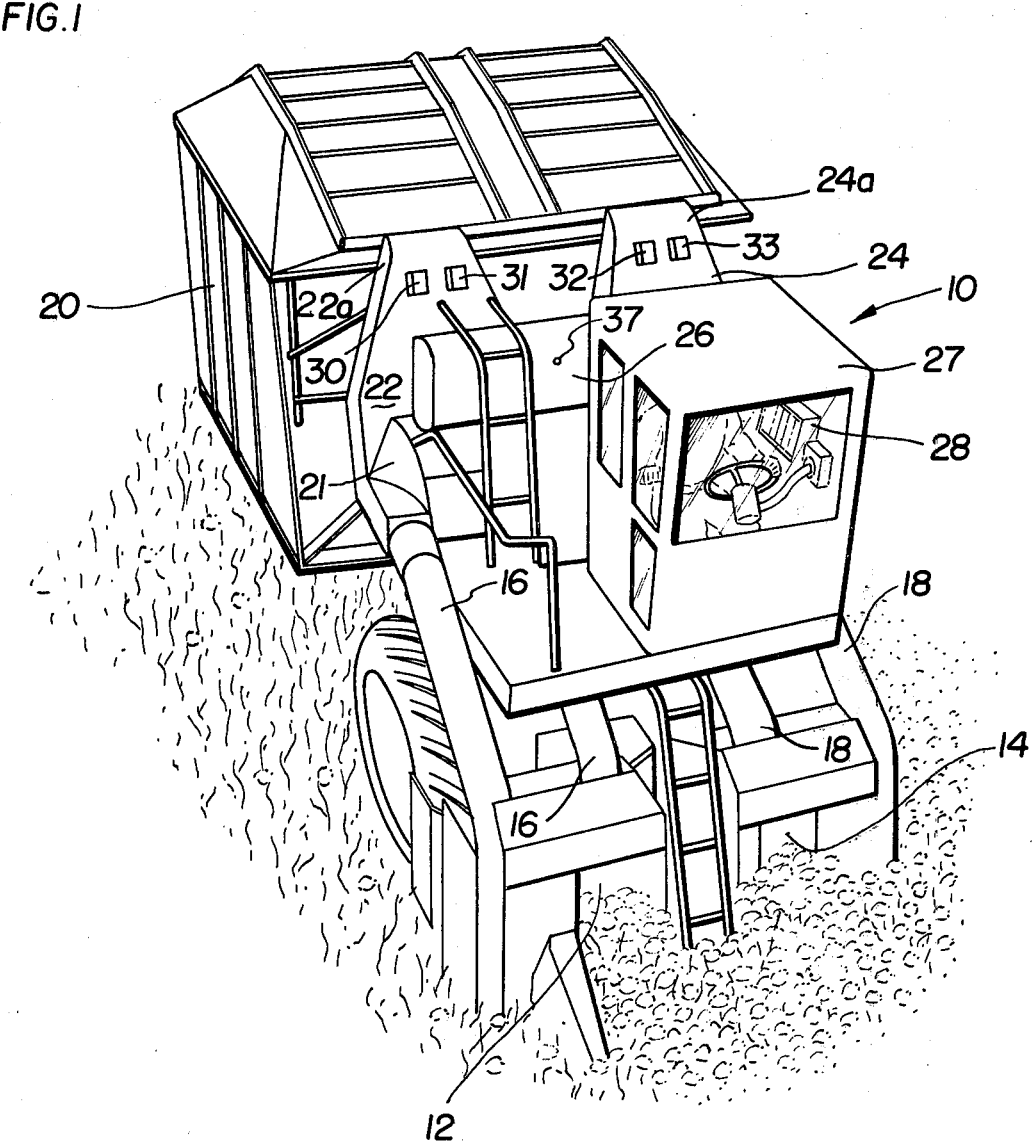
FIG. 1 is a perspective view of a cotton picking machine wherein the monitor system of this invention is utilized.

Referring now to FIG. 1 there is seen the overall construction of a cotton picking machine designated generally by reference numeral 10 and wherein the monitor system of this invention is utilized to advantage. The cotton picker 10 has a pair of openings 12 and 14 which function as scoops to be transported along rows of cotton so that the cotton is picked up therein. The scoops 12 and 14 are in direct communication with air flow ducts 16 and 18, respectively, which direct the cotton thus harvested to a cage-like receptacle 20 located at the rear of the harvesting apparatus. As is well known, the cotton picker is provided with a large fan housing 21 in communication with the ducts 16 and a second fan housing, not seen on the drawings, in direct communication with the ducts 18. However, it will be understood that a single fan housing can be incorporated to provide air flow through the ducts 16 and 18. The ducts 16 are in fluid communication with a duct housing 22 while the ducts 18 are in direct communication with a duct housing 24. The duct housings 22 and 24 are vertical and extend to the upper portion of the cage-like receptacle 20 so that outlet portions 22a and 24a will direct the picked cotton into the receptacle from the top thereof.

To increase the efficiency of the cotton picker 10 water means is used on the picking elements within the scoops 12 and 14 as is well known in the art. The water is obtained from a conventional water tank 26. The monitor system of this invention may also include means for monitoring the water level within the tank 26 so that the operator of the harvesting apparatus can know when to refill the tank to maintain maximum efficiency of the equipment.

Figure 2:
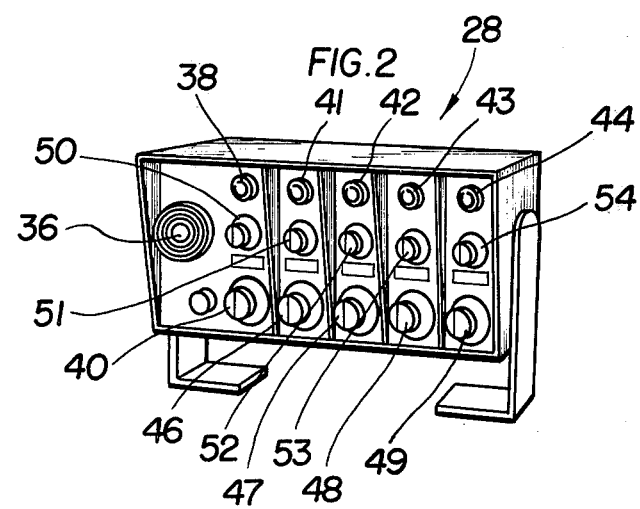
FIG. 2 is a perspective view of the console of the monitor system of this invention.

In the illustrated embodiment, the cotton picking apparatus 10 includes a cab 27 which contains the controls for operation of the cotton picker. Furthermore, a console panel 28 is mounted within the cab 27 to be in easy view and reach of the operator, as is best seen on the drawings. As seen in FIG. 2, the console 28 may include a plurality of indicating lights, each corresponding to a particular function being monitored within the monitor system. For example, the vertical duct members 22 and 24 may be divided into two duct chambers each, thereby providing four separate passages to be monitored. The console 28 therefore will include four indicating lights for the four air flow passages involved, and these lights are on when the air flow is normal. The console may also include an audible alarm which is energized to attract the attention of the operator should any of the indicating lights go out.

In one embodiment, the ducts 22 and 24 are provided with air flow sensing units 30, 31, 32 and 33 near the discharge ends 22a and 24a. The air flow sensing units are operatively coupled to the console 28 to energize the appropriate indicating means therein should the air flow through the duct fall below the predetermined minimum level, thus indicating a stoppage or clog within the duct. While FIG. 1 illustrates one particular form of harvesting apparatus, it will be understood that the air flow indicator units 30, 31, 32 and 33, together with the associated circuitry within the console 28, can be utilized on other harvesting apparatus if desired.

Turning now to FIG. 2, the details of construction of the console 28 FIG. 1 are shown. The console 28 includes an audible alarm 36 which is energized in response to actuation of any of the sensing devices associated with the monitor system. For example, should the water level within the tank 26 fall below a predetermined minimum level, a sensing device 37, of FIG. 1, will actuate appropriate circuitry to de-energize an indicating lamp 38. As long as the lamp 38 remains on, there is sufficient water in the tank 26. When the indicating lamp 38 goes out the audible alarm 36 is energized to attract the attention of the operator. The level at which the sensing device 37 will energize the audible alarm 36 is at a point which enables the operator to finish a limited amount of harvesting. This enables the user to finish one or two rows and return to a side of the field where a new water supply may be obtained.

The console 28 further includes a plurality of indicating lights 41, 42, 43, and 44 associated with the air flow sensors 33, 31, 32 and 30, respectively. Each of these indicating lights are energized in response to sensing a predetermined minimum flow of air through the air flow ducts associated therewith. In one form of sensor used in this invention the minimum rate of particle flow is preselected by tuning knobs 46, 47, 48 and 49, while in another form of the invention the minimum air flow is fixed. Furthermore, each of the indicating lights 38, 41, 42, 43 and 44 may be associated with range switches 50, 51, 52, 53 and 54 which provide low, medium and high range operation for the circuit associated therewith.

For a better understanding of one form of this invention, reference is now made to FIG. 3 which illustrates four separate air flow ducts positioned in a row adjacent one another to direct cotton from their outlets to a receptacle such as the cage-like receptacle 20 of FIG. 1. While FIG. 3 illustrates four discrete ducts, it will be understood that partitioned pairs of ducts can be utilized as well. Accordingly, the representation illustrated in FIG. 3 is for purposes of illustration only. The plurality of ducts are designated generally by reference numerals 60, 61, 62 and 63 each having vertical flat-wall portions 64, 65, 66 and 67, respectively. The upper ends of the ducts 60–63 are provided with outlets 68, 69, 70 and 71. The ducts 60–63 are here illustrated substantially uniformly in the cross-section throughout their entire length. However, it will be understood that the ducts may be tapered, as illustrated in FIG. 1, as well as being cylindrical in configuration if desired.

Most advantageously, each of the ducts 60–63 is provided with an air flow sensing unit 76, 77, 78 and 80, respectively, which corresponds to the sensing units 30–33 shown in FIG. 1. The air flow sensing units are tied together along a common cable 81 and therefrom to an input connection at the console 28 of FIGS. 1 and 2. While all of the air flow sensors 76, 77, 78, and 80 are illustrated as being coupled to the console 28 over a common cable 81, it will be understood that they may be connected thereto over separate cables if desired.

Each of the air flow sensing units 76, 77, 78 and 80 comprises two spaced apart housing elements. Since each of the air flow sensing units is identical, only the sensing unit 76 is shown in detail in FIG. 4. Here the sensing unit 76 comprises two thermistor devices 84 and 86 mounted to their respective housings 87 and 88. The thermistor device 84 is a heated element and its temperature is determined by the rate at which the heat generated is dissipated by the air flow through the duct 64. On the other hand, the thermistor unit 86 is not heated but senses normal ambient temperature. The resistance across the thermistor element 86 is compared with the resistance across the thermistor element 84 and the voltage drop across each thermistor is then compared in a suitable circuitry, to be described hereinbelow.

The housing 87 associated with thermistor 84 is provided with mounting lugs 89 and 90. These mounting lugs are used to secure the housing and thermistor to the exterior flatwall surface of the duct 64, as seen in FIG. 3. Similarly, the housing 88 associated with thermistor 86 is provided with mounting lugs 91 and 92. All of the electronics associated with the air flow sensing units may be mounted in one or the other or both of the housings 87 and 88. Therefore, operating voltage for the electronics, as well as output signals thereof may be delivered to the monitor 28 over a multi-conductor cable 93 which has a portion 93a thereof coupled between the housings 87 and 88. The multi-conductor cable 93 preferably includes plugs 94, 96 and 97 to facilitate installation of the monitor system and connection to the cable 81.

The thermistor elements 84 and 86 are mounted to the housings 87 and 88, respectively, so that they extend a distance therefrom equal to the wall thickness of the duct 64. This is best seen in FIG. 5 which shows a sectional view taken through the housing 88 and thermistor element 86. An aperture 99 is formed in the wall of the duct 64 and the thermistor element 86 is positioned within the aperture to provide a substantially flat surface to the interior of the duct. Therefore, foreign matter will not accumulate about the thermistor element.

In the illustrated embodiment, the thermistor elements 84 and 86 are constructed substantially in the same manner, and the details of their construction are shown in FIG. 5. The thermistor element 86 includes a thermo-conductive plate or disk 100, preferably being formed of brass or the like to which a discrete thermistor 101 is secured. The thermistor 101 has electrical leads 102 and 103 to be secured to the electronic circuitry associated with a circuit board and designated generally by reference numeral 104.

Preferably, the cap 100 is relatively small in size so as to react rapidly to changes in temperature. For example, the cap 100 may be 0.34 inches in diameter, more or less, and in the order of about 0.01 inches thick. The small dimensions of the cap thereby enables the thermistor 101 to be operated by a small amount of power to obtain the desired temperature. Furthermore, the small size of the cap 100 increases the speed at which the temperature of the cap 100 and the thermistor 101 will change when the air flow through the duct decreases below a predetermined minimum level.

The thermistor 101, together with the plate or cap 100, are secured to a circular boss portion 108 which has an opening 107 formed therein. The electrical leads 102 and 103 pass through the opening and through apertures 109 and 110. The opening 107 may be left unfilled or filled with a special thermo insulating epoxy or other suitable sealing and securing material.

Figure 6:
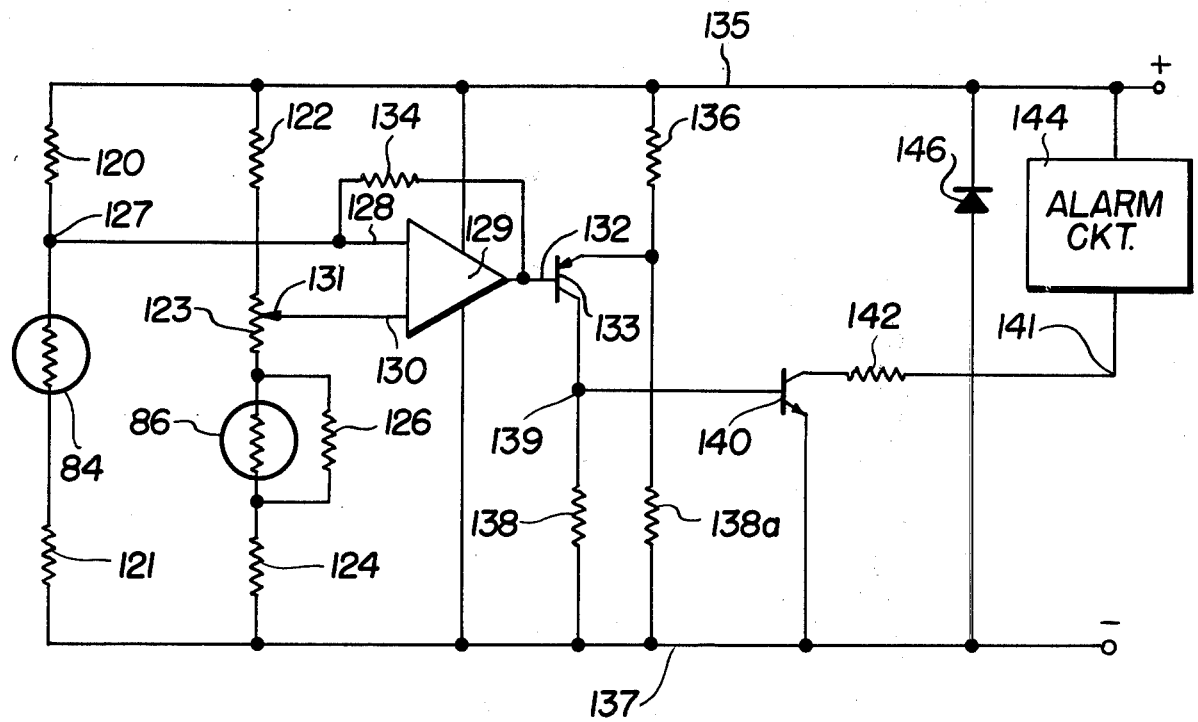
FIG. 6 is a detailed schematic wiring diagram of the circuitry associated with the air flow sensors of FIGS. 4 and 5.

The circuitry associated with the circuit board 104 is illustrated schematically in FIG. 6. Here it can be seen that the thermistor unit 84 is electrically connected in series with a pair of current-limiting resistors 120 and 121 which provide sufficient current flow through the series-connected thermistor to heat it without causing the thermistor to malfunction. The ambient temperature-sensing thermistor 86 is connected in series with a fixed resistor 122, a potentiometer 123 and a fixed resistor 124. A resistor 126 is coupled across the thermistor element 86. A circuit point 127, between resistor 120 and thermistor 84, is coupled to the plus input terminal 128 of an operational amplifier 129. The negative input terminal 130 of the operational amplifier 129 is coupled to a wiper element 131 of the potentiometer 123.

The operational amplifier 129 has the output lead 132 thereof coupled to the base electrode of a transistor 133 and back to the positive input line 128 through a feedback resistor 134. The operational amplifier 129 operates as a differential amplifier and compares the voltage at the two inputs thereof, as obtained from thermistors 84 and 86, to render transistor 133 conductive, when the air flow through the duct is below the predetermined minimum level. Transistor 133 has the emitter electrode thereof coupled to a positive line 135 through a resistor 136. The collector electrode of transistor 133 is coupled to a ground or negative line 137 through a resistor 138. A circuit point 139 is coupled to the base electrode of a switching transistor 140. The switching transistor 140 has the collector electrode connected to an output terminal 141 through a resistor 142. Resistor 142 is of a relatively low value and connected in series with the collector-emitter junction of transistor 140 and an alarm circuit 144. The alarm circuit 144 may include both the audible alarm and the visual indicating light as mentioned above with regard to the console 28 of FIG. 2. Energization of transistor 140 will provide a current path from the positive line 135 through the alarm circuit to terminal 141 and to ground potential at line 137. Connected across the positive line 135 and negative line 137 is a diode 146 which is reverse-biased.

Figure 7:
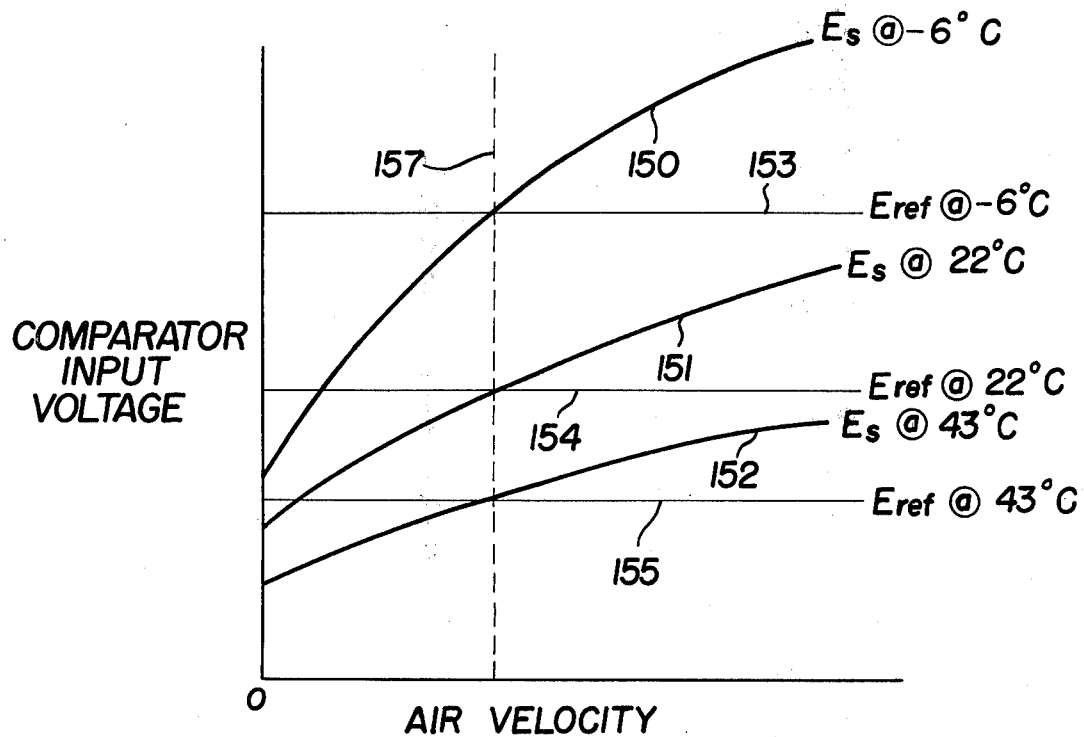
FIG. 7 is a graph illustrating the operation of the circuit of FIG. 6.

In operation of the circuitry shown in FIG. 6, the self-heated thermistor 84 is energized by current through the current-limiting resistors 120 and 121. These resistors limit the amount of current passing through the thermistor 84 and keep it from overheating and destroying itself. The voltage developed at circuit point 127 changes with the resistance value of the thermistor 84 which, in turn, is a function of its temperature. For a better understanding of the relationship of voltage versus temperature of the thermistor 84, reference should be made to FIG. 7. As the thermistor 84 is cooled, due to either a decrease in ambient temperature or air flow through the duct above a predetermined minimum level, the voltage at terminal point 127 increases. This is seen by the family of curves designated generally by reference numeral 150, 151 and 152. The voltage at terminal point 127 is represented by $E_s$ while the voltage in input terminal 130 of the operational amplifier 129 is represented by $E_{ref}$. The reference voltage is represented by the horizontal lines 153, 154 and 155 of FIG. 7. The threshold level at which both voltages are the same is indicated by the vertical broken line 157. In order to trigger the alarm circuit 144 as a result of air flow through the duct decreasing below a predetermined minimum level, the ambient temperature must be considered at all times. The ambient temperature-sensing thermistor 86, together with potentiometer 123, provide the reference voltage at the input terminal 130 of operational amplifier 129. The resistors 122, 123, 126, and 124, together with thermistor 86, form a voltage divider network which establishes the appropriate reference potential. The component values of the resistors, as well as the thermistor, are chosen to give the fundamental relationship between the reference voltage so that the desired threshold level can be selected as shown by the graph of FIG. 7. By way of example, the value of resistor 122 may be 18 K ohms, the value of resistor 123 may be 10 K ohms, the value of resistor 126 may be 100 K ohms and the value of resistor 124 may be in the order of about 8.2 K ohms. These values will produce the characteristic curves as seen in FIG. 7. However, it will be understood that other values may be incorporated if desired.

The feedback resistor 134 provides a positive feedback to the input terminal 128 and is used to prevent oscillation about the threshold switching point. Therefore, the operational amplifier operates substantially in a snap-action configuration once it is rendered operative when the voltage $E_s$ drops below the reference voltage $E_{ref}$ as seen in FIG. 7. The value of resistor 136 in the order of about 470 ohms, while resistor 138 is about 22 K ohms. The value of resistor 138a is also 470 ohms. Resistors 136 and 138a establish a voltage level on the emitter junction of transistor 133 which is substantially equal to ½ that of the voltage applied to a line 135. The output condition of the operational amplifier 129 is such that it will cause transistor 133 to be either non-conductive or conductive in a saturated or substantially saturated state. This action will render transistor 140 conductive or non-conductive in unison therewith. Transistor 140 is a switching device of the type to provide substantial current therethrough for operating the alarm circuit 144.

Therefore, the operation of the circuit will energize the alarm 144 when voltage $E_s$ at terminal point 127 falls below the threshold voltage, as indicated in FIG. 7, when the air flow through the duct falls below a predetermined minimum level. As mentioned above, the reference potential can be adjusted by potentiometer 123 to compensate for component tolerance.

Figure 8:
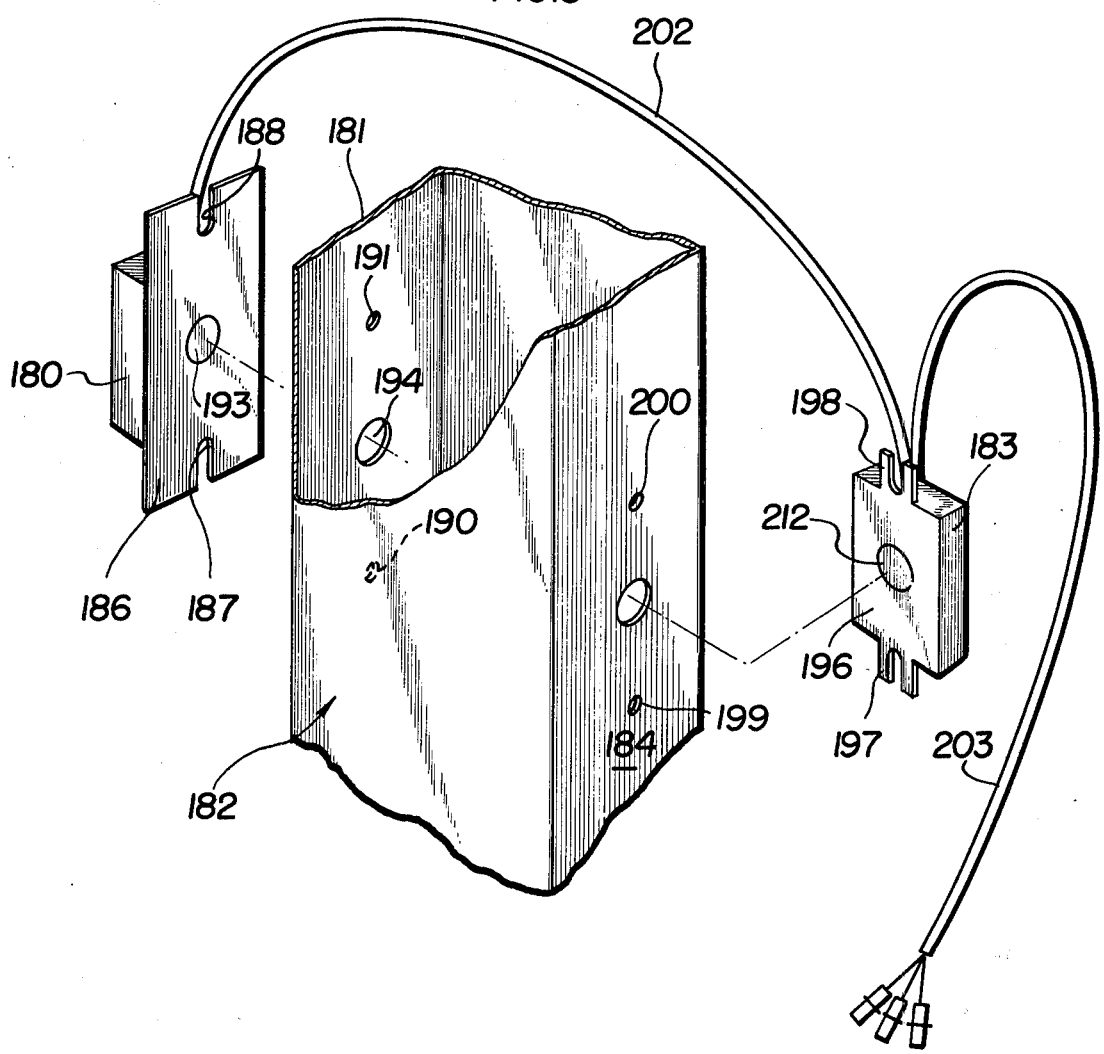
FIG. 8 is an alternative form of sensing device constructed in accordance with the principles of this invention.

Referring now to FIG. 8, there is seen an alternate embodiment of this invention and can be utilized substantially in the same manner as set forth in regard to the embodiment of FIGS. 3, 4, 5, 6, and 7. In FIG. 8, the air flow sensing means includes a light source 180 to be mounted to one exterior wall 181 of a duct 182. A light detector device 183 is mounted to an opposite wall 184 of the duct 182. The light source 180 includes a mounting plate 186 having slots 187 and 188 therein to be placed in alignment with apertures 190 and 191, respectively, to receive fasteners therethrough. The light source may include a light-producing element or lens 193 which is sized to fit through an aperture 194 of the wall 181. As mentioned above, it is important that the inner surface of the wall 181 be substantially free of obstruction and, therefore, the depth of the light-producing element or lens 193 is limited to that of substantially the wall thickness of the wall 181.

Similarly, the light detector 183 includes a mounting plate 196 having mounting tabs 197 and 198 extending therefrom. The mounting tabs are placed in registry with apertures 199 and 200, respectively, to be fastened to the wall 184. The light detector includes a light detecting element extending from the plate 196 a distance sufficient to correspond substantially to the thickness of the material forming the wall 184. Therefore, the light detector does not extend into the duct chamber. The air flow detector circuit of FIG. 8, therefore, senses air flow indirectly by measuring the movement of articles between the light source and the light detector. This can be accomplished in several different manners. For example, the electronic circuitry coupled to the light source and the light detector may incorporate circuit means for detecting pulses corresponding to interruptions of the light source as a result of cotton passing through the duct. A timing circuit may be utilized to insure that should there be interruptions below a predetermined minimum rate, thus corresponding to a decrease in flow of air through the duct, an alarm would be given. A second configuration would be that of merely sensing a blockage within the duct 182. This would cause the light beam pulses from the light source 193 to be interrupted and produce either no light output or a steady light output, which in either case would cause an indication of a malfunction.

The light source 180 and the light detector 183 are tied together over a common cable 202, which is connectable with the above-described cable 81 and console 28. It will be understood also that the electronic components associated with the light source and light detector may be mounted in either one of both of the housings associated therewith. The operating potential for operation of the detector circuit is applied thereto by a cable 203. This cable also includes the output signal from the light detector to be delivered to the console 28, of FIG. 2.

Figure 9:
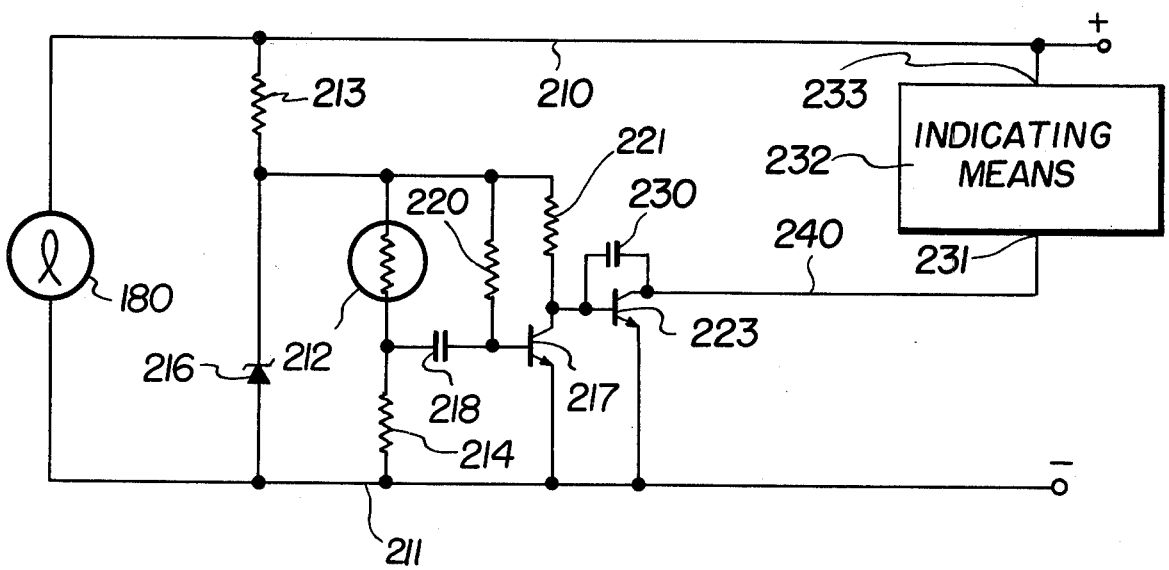
FIG. 9 is a detailed wiring schematic view of the circuitry associated with the sensors of FIG. 8.

For a better understanding of the circuitry associated with the photoelectric approach to the air flow detector of FIG. 8, reference is now made to FIG. 9.

Referring now to FIG. 9, there is seen the details of the electronic circuitry associated with the photoelectric air flow indicator arrangement shown in FIG. 8. Here the light source 180 is connected across lines 210 and 211 which may be the 12-volt battery line obtained from the motor-generator set of the farm implement. The light-responsive element used herein is a photocell and designated generally by reference numeral 212. The photocell 212 is connected in series with a resistor 213 connected to line 210 and a resistor 214 connected to line 211. The operating voltage applied to the photocell 212 is maintained substantially constant by means of a Zener diode 216. The output of the photocell 212 is coupled to the base electrode of a transistor 217 by means of a coupling capacitor 218. Operating bias is applied to transistor 217 through a base-connected resistor 220. Current through transistor 217 is limited by means of a resistor 221. When transistor 217 is rendered conductive, the base electrode of a switching transistor 223 is connected substantially to the same potential as that of line 211 and the transistor is maintained nonconductive. A capacitor 230 is connected between the collector electrode and the base electrode of transistor 223 and may act as a filtering means. The collector electrode of transistor 223 is connected to an output terminal 231 of an indicating means 232. The indicating means has another terminal 233 coupled to the line 210. Therefore, operating current for the indicating means 232 flows from the line 210 through the indicating means through a signal line 240 and through the transistor 223.

In operation, the duct carrying the cotton from the picking machine to the basket at the rear thereof is provided with the light source 180 on one wall and the light detector 183 on the opposite wall. The arrangement of the light source and light detector is such that the light is directed to the photocell 212. As mentioned above, the electronic components associated with FIG. 9 may also be located in one of the housings associated with either the light source or the light detector. Furthermore, it will be understood that the housings may be filled with epoxy to protect the components from the environment in which it is used. While the light source 180 is here indicated as an incandescent lamp, it will be understood that it may be any suitable light-emitting device such as a light-emitting diode. Furthermore, it will be understood that the housing containing the light source 180 may be transparent so that the light source located therein will direct the light beam across the chute as described above. Such a transparent housing facilitates easy installation and removal of the light should it become defective. The lamp 180 is of sufficient intensity to provide light across the distance of the chute. The resistor 213 and Zener diode 216 form an 8-volt regulated power supply for operation of the photocell 212. The resistance of the photocell 212 increases when light is removed therefrom. This increase in resistance causes a decrease in the voltage at the input of capacitor 218 which, in turn, turns off transistor 217. When transistor 217 is non-conductive, transistor 223 is rendered conductive to energize the indicating means 232. The passage of cotton through the duct 182 will cause periodic interruption of the light beam between the light source 180 and the light detector 183. However, suitable filtering means may be provided to hold the indicating means inoperative until the rate at which the interruptions occur falls below a predetermined minimum rate, which, in turn, will correspond to a predetermined minimum air flow through the duct.

In accordance with another aspect of this invention, reference is now made to FIGS. 10, 11, 12, 13 and 14. A pair of thermocouples 300 and 301 are constructed by providing relatively thin, circular disks 300a and 301a of brass material on the order of about 0.005 inches thick and 0.48 inches in diameter. The brass disks are provided with an electroless nickel finish in the illustrated embodiment. A constantan wire 302 has one end 303 thereof soldered or otherwise secured to the disk 300a as indicated by reference numeral 304. Similarly, the other end 306 of the constantan wire 302 is soldered or otherwise secured to the disk 301a as indicated by reference numeral 307. Soft solder or silver solder may be used, as well as brazing if desired. A copper wire 308 has the end 309 thereof secured to the disk 300 by solder or other suitable means as indicated by reference numeral 310. The ends 303 and 309 are spaced apart on the disk 300. However, it will be understood that the spacing may vary from between touching one another to the extreme diameter of the disk. A second copper wire 311 has the end 312 thereof secured to the disk 301a as indicated by reference numeral 313. The end 312 is maintained spaced apart from the end 306 of the constantan wire and the disk 301 serves as means for the thermocoupled junction formed by the copper and constantan wires. The disk has a surface area many times larger than a junction made directly between the constantan and copper wires. Therefore, the heat transfer characteristic of the thermocouples 300 and 301 are substatially increased.

In accordance with one aspect of the invention, a resistor 314 is secured to the disk 300 and preferably held in place with a quantity of thermally conductive epoxy, indicated by reference numeral 316. Energizing current passes through the resistor 314 to heat the resistor and the associated thermocouple 300.

Figure 10:
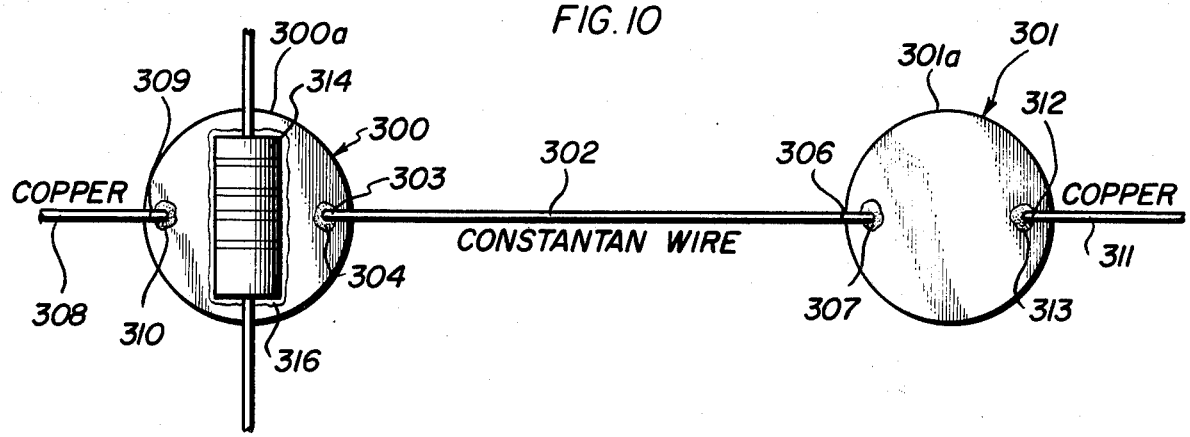
FIG. 10 is an enlarged plan view of a pair of thermocouples constructed in accordance with this invention with one thermocouple being heated by a resistor and the other thermocouple adapted to sense ambient temperature.

The thermocouple assembly shown in FIG. 10 utilizes the resistor 314 to heat the disk 300a so that power will be dissipated equal to the formula ($V^2/R$), V being the voltage applied to the resistor and R being the value of resistance. Since the voltage applied to the resistor is constant, a constant amount of power is dissipated in the disk assembly. If the temperature at the junction of the copper wire and the disk is equal to the temperature at the junction of the constantan wire and the disk, the circuit can be analyzed as one wherein the copper constantan junctions are in fact in contact with one another. For all practical purposes, it has been discovered that the junction spaced apart, as illustrated in FIG. 10, functions as though the copper and constantan elements were in direct contact with one another. This is true for the junctions on the unheated disk 301a. Thus there exists one thermocoupled junction heated above ambient temperature by a constant power source and a reference thermocoupled junction heated only by the ambient temperature.

The following equation illustrates the principles of operation of the thermocouple arrangement disclosed herein. The power dissipated by the thermocouple assembly 300 can be expressed as the equation (power dissipated) = $K(T_h - T_a)$, wherein $T_h$ = the temperature of the heated thermocouple 300 and $T_a$ = the temperature of the ambient unit 301. Power dissipation, as mentioned earlier, is substantially constant. The voltage across the heated and unheated thermocouples is approximately proportional to the difference between $T_h$ and $T_a$. However, it is not in exact proportion since the thermocouple structures are not perfectly linear. By monitoring the thermocouple voltage, the thermoconductivity K can be monitored. The thermoconductivity K changes with the air flow across the thermocouple elements. Therefore, the output of the thermocouples can provide a signal which corresponds to an acceptable approximation of the measure of air flow thereacross.

Figure 11:
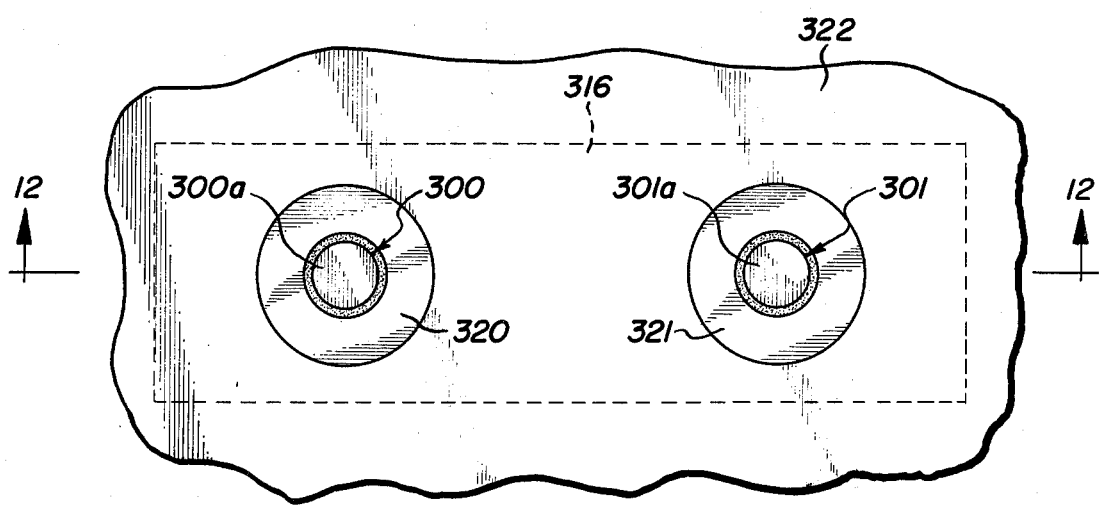
FIG. 11 is a plan view of the thermocouples of this invention secured to their support housing and inserted into the duct wall of an air flow passage in accordance with this invention.
Figure 12:
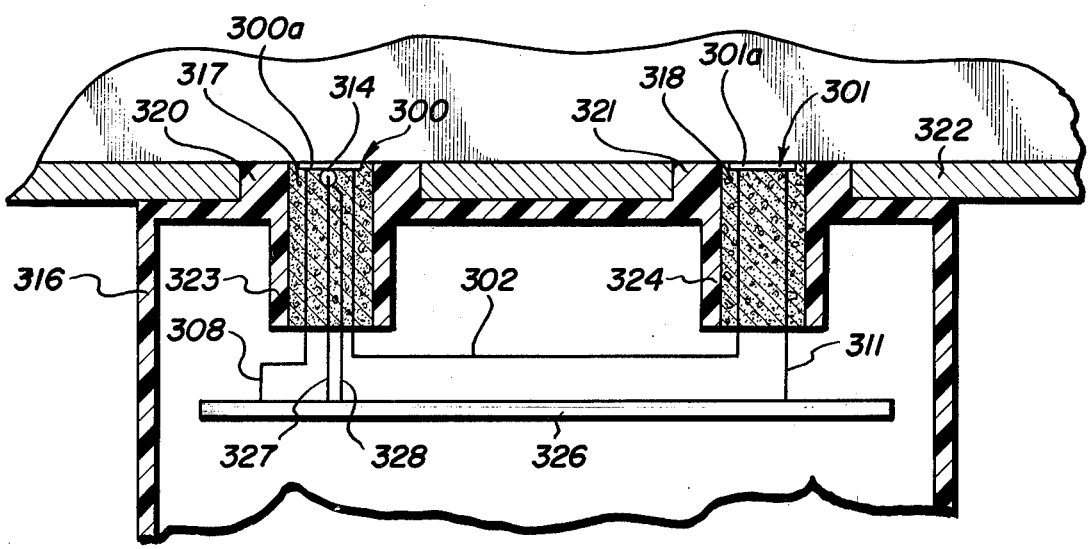
FIG. 12 is a sectional view taken along 12—12 of FIG. 11.

Referring now to FIGS. 11 and 12, there is seen a detailed construction of the thermocouple elements 300 and 301. The brass disks 300a and 301a are assembled into a housing 316. The thermocouples are preferably held in position by a foam type epoxy designated generally by reference numerals 317 and 318. The epoxy material 317 and 318 preferably functions to thermally isolate the disks 300a and 301a from the housing material. The thermocouples 300 and 301 extend from the housing by means of circular islands 320 and 321 having a thickness substantially equal to the thickness of the material forming the wall 322 of the duct into which the thermocouples are inserted. The thermocouples therefore provide a substantially smooth surface with the wall 322 to eliminate the possibility of cotton or other material from collecting around unwanted projections into the duct.

The housing 316 includes a circular cavity forming portion 323 and 324 into which are inserted the wires of the thermocouples 300 and 301 respectively. A circuit board 326 has the appropriate and necessary electronic circuitry for operating the thermocouples. The leads from thermocouple 300 and heating resistor 314 extend through the foam epoxy material and are connected to the circuit board 326 by the copper lead 308 and the leads 327 and 328 from the resistor 314. Also connected to the circuit board 326 is the lead 311 from thermocouple 301.

Figure 13:
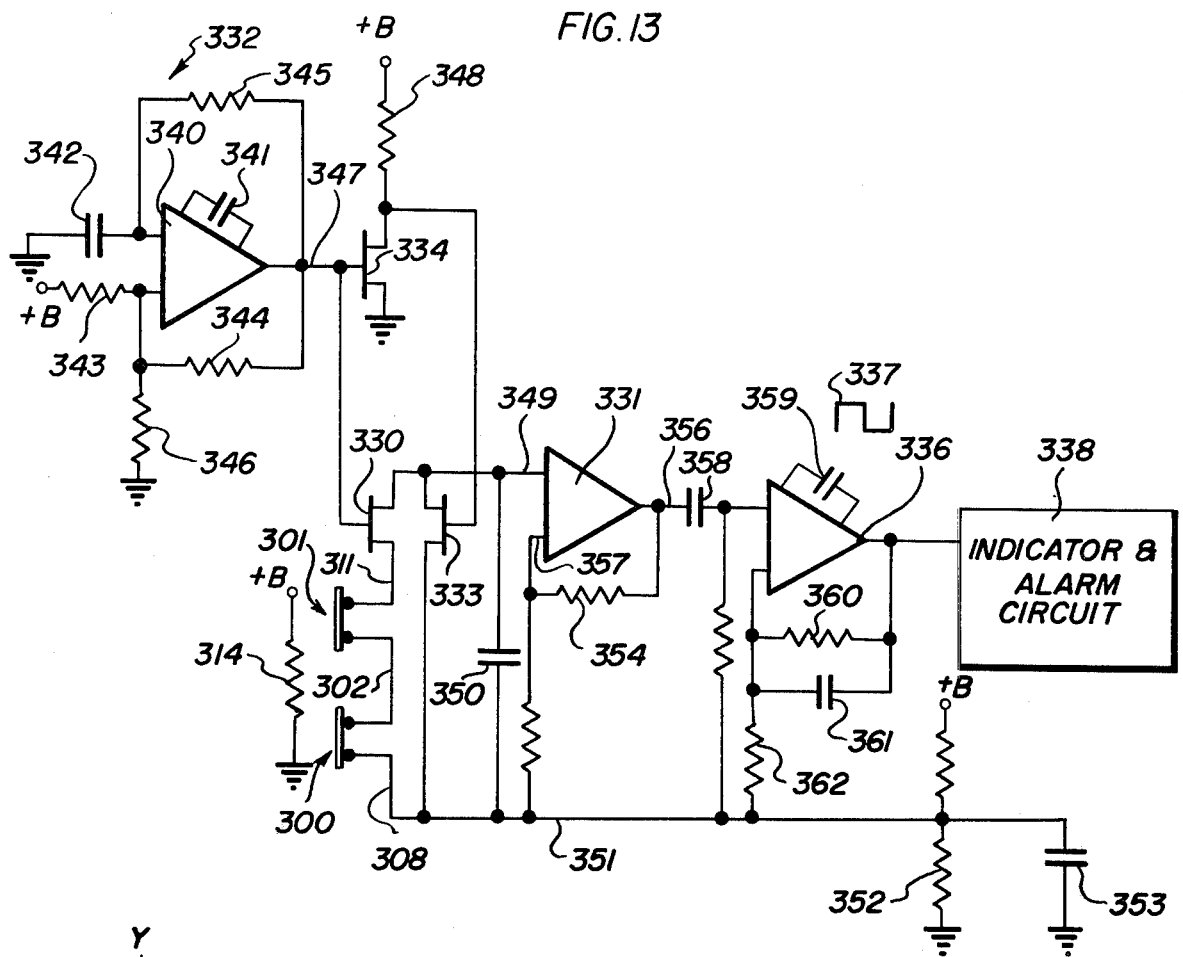
FIG. 13 is a detailed schematic view of the sensing circuit utilized to sense the output of the thermocouples of FIGS. 10, 11 and 12
Figure 14:
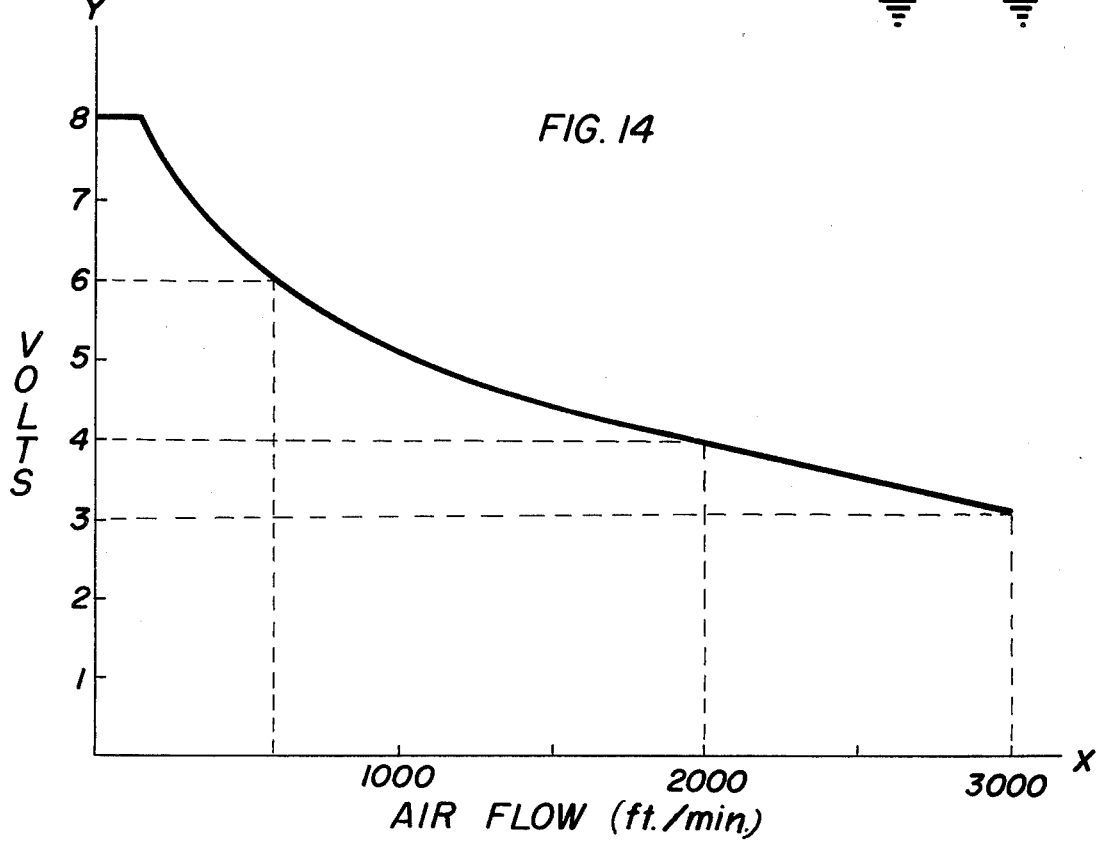
FIG. 14 is a graph showing the peak to peak output voltage of the circuit of FIG. 13 with regard to the rate of air flow across the thermocouples of FIGS. 10, 11 and 12.

Referring now to FIG. 13, there is seen a detailed circuit arrangement utilized to operate the thermocouples 300 and 301. Here, the thermocouples 300 and 301 are shown connected in series with a semiconductor switching device 330 and therethrough coupled to the input of an operational amplifier circuit 331. An oscillator circuit 332 is provided to alternately switch the thermocouples in and out of circuit with the control circuit. The output of the oscillator circuit 332 is applied to a transistor 330 during one half-cycle of oscillation thereof and to a second transistor 333 during the other half-cycle of oscillation when a switching transistor 334 is rendered nonconductive. Accordingly, the input to amplifier 331 alternately switches between the voltage developed across the thermocouples 300 and 301 and a reference voltage obtained from transistor 333. The square-wave signal applied to operational amplifier 331 is amplified by a second operational amplifier stage 336 to produce a square-wave signal as indicated by reference numeral 337. The peak-to-peak value of the square-wave 337 corresponds to the temperature difference between thermocouples 300 and 301. This is best illustrated in FIG. 14 which shows the rate of air flow in feet per minute along the X axes and the peak-to-peak voltage along the Y axes. It can be seen that an air flow of 500 feet per minute produces a square-wave having a peak-to-peak voltage of 6-volts. On the other hand, an air flow of 2,000 feet per minute produces a peak-to-peak square-wave of 4-volts. This voltage differential is applied to an indicator and alarm circuit where it is used to indicate that an air flow of a predetermined minimum value has been reached.

The oscillator circuit 332 comprises an operational amplifier 340 having a capacitor 341 connected across bypass terminals thereof. A capacitor 342 has one end thereof coupled to an input of the operational amplifier 340 and the other end thereof connected to ground potential. Power is applied to the operational amplifier through a line connected to a resistor 343. Also connected to the input of operational amplifier 340 are two feedback paths through resistors 344 and 345. The junction of resistor 343 and resistor 344 includes a third resistor 346 having the other end thereof connected to ground potential. The output of operational amplifier is delivered along a line 347 to the base electrode of a switching device such as a field effect transistor, or any other suitable switching transistor. The transistor 334 therefore switches between conductive and nonconductive states in accordance with the oscillations obtained from the oscillator circuit. As mentioned above, transistor 334 alternately renders transistor 333 conductive during one-half cycle of operation from oscillator 332 and renders it nonconductive during the other half-cycle. Transistors 334 receives operating potential through a load resistor 348. The input line 349 of operational amplifier 331 has a capacitor 350 connected thereto and to a reference line 351. The reference line 351 is coupled to ground potential through a resistor 352 and a filter capacitor 353.

The operational amplifier 331 has a resistor 354 coupled between the output lead 356 thereof and an input terminal 357. The square-wave signal produced along line 356 is delivered through a capacitor 358 to the input of the second operational amplifier 336. This amplifier has a bypass capacitor 359 connected thereto along with a feedback circuit path provided by a resistor 360 and a capacitor 361. Capacitor 361 and resistor 360 are also connected to a resistor 362 to apply bias potential to the circuit. The square-wave 337 at the output of operational amplifier 336 is applied to the indicating and alarm circuit 338 as mentioned above. The indicating and alarm circuit 338 may correspond to any one of the plurality of alarms comprising lights 38, 41, 42, 43 or 44 mounted on the monitor panel 28 as seen in FIG. 2. It will be noted that the embodiment of FIG. 10-14, as well as other embodiments herein, can be used to function as a flow rate device.

While several embodiments of the present invention have been illustrated herein in great detail, it will be understood that variations and modifications may be effected without departing from the spirit and scope of the novel concepts set forth in the following claims.

The invention claimed is as follows:

1. In a monitor system for use in an agricultural harvesting apparatus such as a cotton picker having a picker head, a receptacle end, and a duct means through which a stream of air passes for conveying harvested crop therewith from said head to said end, said monitor system operable to detect a blockage anywhere in said duct means, the combination comprising: pressure-insensitive static sensing means responsive to changes in air flow anywhere in said duct means and mounted in communication with said duct means, said sensing means providing a first signal condition in response to the flow of air above a predetermined minimum level and a second signal condition in response to the flow of air below said predetermined minimum level, switching circuit means coupled to said air flow sensing means for providing a first switching state in response to said first signal condition and a second switching state in response to said second signal condition, and indicator means coupled to said switching circuit means for providing a first indication, when said switching circuit is in said first switching state, that the stream of air passing through said duct means is above said predetermined minimum level, and for providing a second indication, when said switching circuit is in said second switching state, that the stream of air passing through said duct means is below said predetermined minimum level, said air flow sensing means including a heated element energized by a source of electrical power, said heating element including means for mounting in communication with the interior of said duct means and out of the flow path of said duct means to be cooled by the flow of air passing therethrough, said heated element reaching a first temperature for providing said first signal condition when the flow of air is above said predetermined minimum level and a second temperature for providing said second signal condition when the flow of air is below said predetermined minimum level.

2. A monitor system for use in an agricultural harvesting apparatus as set forth in claim 1 further including ambient temperature-sensing means for sensing the ambient temperature about said duct means, and circuit means coupled to said heated element and said ambient temperature-sensing means for actuating said switch means to said first switching state when said heated element is cooled by the flow of air above said predetermined minimum level and for producing said second switching state when said heated element is heated when the flow of air is below said predetermined minimum level.

3. In a monitor system for use in agricultural harvesting apparatus as set forth in claim 2 wherein said heated element and said ambient temperature-sensing element are thermistors.

4. In a monitor system for use in agricultural harvesting apparatus as set forth in claim 3 wherein said thermistors are mounted on flat plate elements to be secured to said duct means flush with the interior wall surface thereof.

5. A monitor system for use in agricultural harvesting apparatus as set forth in claim 2 further including an operational amplifier circuit having one input coupled to said heated element and another input coupled to said ambient temperature-sensing element, said operational amplifier forming a differential amplifier circuit having an output coupled to said switching circuit means for providing said first switching state in response to a first difference of temperature between said heated element and said ambient temperature sensing element when said heated element is cooled by the flow of air above said predetermined minimum level and for providing said second switching state in response to a second difference of temperature between said heated element and said ambient temperature sensing element when said heated element is heated by a decrease in the flow of air through said duct means below said minimum predetermined level.

6. In a monitor system for use in an agricultural harvesting apparatus as set forth in claim 5 wherein said switching circuit means includes a transistor which is rendered non-conductive during said first switching state and conductive during said second switching state.

7. In a monitor system for use in an agricultural harvesting apparatus such as a cotton picker having a picker head, a receptacle end, and a duct means through which a stream of air passes for conveying harvested crop therewith from said head to said end, said monitor system operable to detect a blockage anywhere in said duct means, the combination comprising: pressure-insensitive static sensing means responsive to changes in air flow anywhere in said duct means and mounted in communication with said duct means, said sensing means providing a first signal condition in response to the flow of air above a predetermined minimum level and a second signal condition in response to the flow of air below said predetermined minimum level, switching circuit means coupled to said air flow sensing means for providing a first switching state in response to said first signal condition and a second switching state in response to said second signal condition, and indicator means coupled to said switching circuit means for providing a first indication, when said switching circuit is in said first switching state, that the stream of air passing through said duct means is above said predetermined minimum level, and for providing a second indication, when said switching circuit is in second switching state, that the stream of air passing through said duct means is below said predetermined minimul level said air flow sensing means including a light source to be mounted to one wall of said duct means for directing a light beam across the interior of said duct means to an opposite wall thereof, a light detector to be mounted to said opposite wall of said duct means for receiving light from said light source and producing said first signal condition in response to movement of material with a flow of air above said predetermined minimum level and for producing said second signal condition in response to a decrease in movement of material when the flow of air-transported material in said duct means is below said predetermined minimum level, and said switching circuit means including a semi-conductor device which is maintained non-conductive in response to said first signal condition and which is rendered conductive in response to said second signal condition, and wherein said indicator means is energized by said semiconductor device when in said conductive state.

8. In a monitor system for use in agricultural harvesting apparatus such as a cotton picker having a picker head, a receptacle end, and a duct means through which a stream of air passes for conveying harvested crop therewith from said head to said end, said monitor system operable to detect a blockage anywhere in said duct means, the combination comprising: pressure-insensitive static sensing means responsive to changes in air flow anywhere in said duct means and mounted in communication with said duct means, said sensing means providing a first signal condition in response to the flow of air above a predetermined minimum level and a second signal condition in response to the flow of air below said predetermined minimum level, switching circuit means coupled to said air flow sensing means for providing a first switching state in response to said first signal condition and a second switching state in response to said second signal condition, and indicator means coupled to said switching circuit means for providing a first indication, when said switching circuit is in said first switching state, that the stream of air passing through said duct means is above said predetermined minimum level, and for providing a second indication, when said switching circuit is in said second switching state, that the stream of air passing through said duct means is below said predetermined minimum level, said air flow sensing means including first and second thermocouples spaced apart from one another and positioned in air-flow sensing relation in communication with but out of the flow path of said duct means, heater means positioned adjacent said first thermocouple for heating the same above ambient temperature, said first thermocouple producing an output signal in response to said heated temperature, said second thermocouple producing an output signal in response to said ambient temperature, said switching circuit means including means to sense the difference voltage between the first and second output signals from said first and second thermocouples, respectively, to produce said first switched state when said difference voltage is below a predetermined minimum value.

9. A monitor system as set forth in claim 8 wherein said first and second thermocouples include a pair of flat plates, a constantan wire connected between said flat plates, and first and second copper wires connected respectively to said first and second flat plates to form a thermocouple junction with said constantan wire.

10. A monitor system as set forth in claim 9 wherein said constantan wire and said copper wire are secured to said flat plates a predetermined spaced apart distance.

11. A monitor system as set forth in claim 9 wherein said flat plates are round discs.

12. A monitor system as set forth in claim 9 wherein said heating means is a resistor element secured to said first flat plate by thermo-conductive adhesive.

13. A monitor system as set forth in claim 8 wherein said switch circuit means includes an oscillator circuit, an amplifier circuit, and means connected between said oscillator circuit and said amplifier circuit for connecting said first and second thermocouples to said amplifer circuit during one-half cycle of oscillation from said oscillator means and connecting a reference potential to said amplifier circuit during the other half cycle of said oscillator means.

14. A monitor system as set forth in claim 8 wherein said first and second thermocouples are secured to a housing and extend therefrom a predetermined distance corresponding to the thickness of said duct means, said thermocouples thereby being substantially in the plane of the interior wall surface of said duct means when mounted thereto.

15. A monitor system for use in a cotton picker of the type having a picker head, a storage bin, and duct means through which a stream of air is passed for conveying air-transported cotton from said head to bin, said monitor system operable to detect a blockage anywhere in said duct means, said monitor comprising: pressure-insensitive static sensing means responsive to changes in air flow anywhere in said duct means and mounted in said sensing means providing a first signal condition in response to the flow of air above a predetermined minimum level and a second signal condition in response to the flow of air below said predetermined minimum level, first circuit means coupled to said air flow sensing means for providing a first state in response to said first signal condition and a second state in response to said second signal condition, and indicating means coupled to said first circuit means for providing a first indication, when said first circuit means is in said first state, that the stream of air passing through the duct means is above said predetermined minimum level, and for providing a second indication, when said first circuit means is in said second state, that the stream of air passing through said duct means is below said predetermined minimum level, said air flow sensing means including a heated element to be heated by a source of electrical power, said heated element including means for mounting said duct means in communication with and cooled by the flow of air passing therethrough, said heated element reaching a first temperature for providing said first signal condition when the flow of air is above said predetermined minimum level and a second temperature for providing said second signal condition when the flow of air is below said predetermined minimum level.

16. A monitor system for use in an air flow material conveyor apparatus as set forth in claim 15 further including ambient temperature-sensing means for sensing the ambient tempetature about said duct means, and second circuit means coupled to said heated element and said element temperature-sensing means for actuating said first circuit means to said first state when said heated element is cooled by the flow of air above said predetermined minimum level and for producing said second state when said heated element is heated by said source of electrical power when the flow of air is below said predetermined minimum level.

17. A monitor system for use in an air flow conveyor apparatus as set forth in claim 16 further including an operational amplifier circuit having one input coupled to said heated element and another input coupled to said ambient temperature-sensing element, said operational amplifier forming a differential amplifier circuit having an output coupled to said first circuit means for providing said first state in response to a first difference of temperature between said heated element and said ambient temperature-sensing element when said heating element is cooled by the flow of air above said predetermined minimum level and for producing said second state in response to a second difference of temperature between said heated element and said ambient temperature-sensing element when said heated element is heated by a decrease in the flow of air through the duct means below said minimum predetermined level.

18. A monitor system for use in air flow material conveyor apparatus as set forth in claim 17 wherein said circuit means is a switching circuit and includes a transistor.

19. A monitor system for use in a cotton picker of the type having a picker head, a storage bin, and duct means through which a stream of air is passed for conveying air-transported cotton from said head to said bin, said monitor system operable to detect a blockage anywhere in said duct means, said monitor system comprising: pressure-insensitive static sensing means responsive to changes in air flow anywhere in said duct means and mounted in said sensing means providing a first signal condition in response to the flow of air above a predetermined minimum level and a second signal condition in response to the flow of air below said predetermined minimum level, first circuit means coupled to said air flow sensing means for providing a first state in response to said first signal condition and a second state in response to said second signal condition, and indicating means coupled to said first circuit means for providing a first indication, when said first circuit means is in said first state, that the stream of air passing through the duct means is above said predetermined minimum level, and for providing a second indication, when said first circuit means is in said second state, that the stream of air passing through said duct means is below said predetermined minimum level, said air flow sensing means including a light source to be mounted to one wall of the duct means for directing a light beam across the interior of the duct means to an opposite wall thereof, a light detector to be mounted to said opposite wall of the duct means for receiving light from said light source and producing said first signal condition in response to movement of material with a flow of air above said predetermined minimum level and for producing said second signal condition in response to a decrease in movement of material when the flow of air is below said predetermined minimum level, and wherein said means includes a transistor to be maintained non-conductive in response to said first signal condition and to be rendered conductive in response to said second signal condition, and wherein said indicator means includes an audible alarm and a visual alarm both to be energized by said transistor when in said conductive state.

* * * * *

UNITED STATES PATENT AND TRADEMARK OFFICE
CERTIFICATE OF CORRECTION

PATENT NO. : 4,068,223
DATED : January 10, 1978
INVENTOR(S) : Ronald W. Steffen

It is certified that error appears in the above-identified patent and that said Letters Patent are hereby corrected as shown below:

Column 8, line 18, after "136" insert --is--;

Column 9, line 21, "one of" should be --one or--;

Column 12, line 51, "Transistors" should be --Transistor--;

Column 14, line 52, "minimul" should be --minimum--;

Column 16, line 45, "element" should be --ambient--

Signed and Sealed this

Thirteenth Day of June 1978

[SEAL]

Attest:

RUTH C. MASON
Attesting Officer

DONALD W. BANNER
Commissioner of Patents and Trademarks